United States Patent
Laughlin et al.

(10) Patent No.: US 11,095,678 B2
(45) Date of Patent: Aug. 17, 2021

(54) MOBILE SECURITY COUNTERMEASURES

(71) Applicant: THE BOEING COMPANY, Chicago, IL (US)

(72) Inventors: Brian D. Laughlin, Wichita, KS (US); John William Glatfelter, Kennett Square, PA (US); William David Kelsey, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 248 days.

(21) Appl. No.: 15/648,310

(22) Filed: Jul. 12, 2017

(65) Prior Publication Data

US 2019/0020676 A1   Jan. 17, 2019

(51) Int. Cl.
  *H04L 29/06*     (2006.01)
  *G06F 21/31*     (2013.01)
  *G06N 20/00*     (2019.01)

(52) U.S. Cl.
  CPC ........ *H04L 63/1441* (2013.01); *G06F 21/316* (2013.01); *G06N 20/00* (2019.01); *H04L 63/1416* (2013.01); *G06F 2221/2127* (2013.01); *G06F 2221/2143* (2013.01); *H04L 63/102* (2013.01); *H04L 63/105* (2013.01)

(58) Field of Classification Search
  CPC .................. G06N 20/00; G06F 21/316; G06F 2221/2127; G06F 2221/2143; H04L 63/1441; H04L 63/1416; H04L 63/102; H04L 63/105; H04L 63/1491; H04L 63/20; H04L 2463/144
  USPC .......................................................... 726/23
  See application file for complete search history.

(56) References Cited

U.S. PATENT DOCUMENTS

| | | | | |
|---|---|---|---|---|
| 6,981,155 B1* | 12/2005 | Lyle | ........................ | G06F 21/53 703/21 |
| 7,042,852 B2* | 5/2006 | Hrastar | ............... | H04L 63/1441 370/310 |
| 7,096,499 B2* | 8/2006 | Munson | .............. | G06F 11/3612 714/E11.209 |
| 7,647,645 B2* | 1/2010 | Edeki | ...................... | G06F 21/31 726/28 |

(Continued)

OTHER PUBLICATIONS

Arslan, et al., "A Review on Mobile Threats and Machine Learning Based Detection Approaches", IEEE Xplore, May 19, 2016, 7 pages.

(Continued)

*Primary Examiner* — Shahriar Zarrineh
(74) *Attorney, Agent, or Firm* — Moore IP Law

(57) ABSTRACT

A method includes generating a user profile for an authorized user of a mobile device based on behavior patterns associated with the authorized user. The method also includes detecting subsequent user behavior of a particular user during an attempt by the particular user to access the mobile device. The method also includes comparing the subsequent user behavior to the behavior patterns of the user profile to determine whether the particular user is authorized or unauthorized. In response to determining that the particular user is an unauthorized user, the method includes detecting activity by the unauthorized user and performing a countermeasure of a plurality of countermeasures in response to detecting the activity. Each countermeasure of the plurality of countermeasures has a different security level and corresponds to a degree of the activity.

20 Claims, 10 Drawing Sheets

(56) References Cited

U.S. PATENT DOCUMENTS

| | | | | |
|---|---|---|---|---|
| 7,665,134 | B1* | 2/2010 | Hernacki | G06F 21/55 713/161 |
| 8,244,532 | B1* | 8/2012 | Begeja | H04W 4/14 704/250 |
| 8,528,091 | B2* | 9/2013 | Bowen | G06F 21/566 726/24 |
| 8,549,640 | B2* | 10/2013 | Lyle | G06F 21/53 726/23 |
| 8,549,643 | B1* | 10/2013 | Shou | G06F 21/556 726/23 |
| 8,595,834 | B2* | 11/2013 | Xie | G06F 21/316 726/23 |
| 8,732,829 | B2* | 5/2014 | Johnson | G06F 21/552 726/23 |
| 8,843,767 | B2* | 9/2014 | Hars | G06F 12/1408 713/190 |
| 8,875,255 | B1* | 10/2014 | Dotan | G06F 21/31 713/182 |
| 9,009,829 | B2* | 4/2015 | Stolfo | G06F 21/554 726/23 |
| 9,015,075 | B2* | 4/2015 | Hughes | G06F 21/31 700/286 |
| 9,088,903 | B2* | 7/2015 | Kim | H04L 45/22 |
| 9,154,515 | B1* | 10/2015 | Russo | H04L 63/1433 |
| 9,185,083 | B1 | 11/2015 | Glatfelter et al. | |
| 9,185,095 | B1* | 11/2015 | Moritz | H04L 63/102 |
| 9,342,674 | B2* | 5/2016 | Abdallah | G06F 21/31 |
| 9,356,942 | B1* | 5/2016 | Joffe | H04L 43/10 |
| 9,426,139 | B1* | 8/2016 | McClintock | H04L 63/08 |
| 9,529,987 | B2* | 12/2016 | Deutschmann | G06F 21/32 |
| 9,531,710 | B2* | 12/2016 | Deutschmann | H04L 63/0861 |
| 9,838,405 | B1* | 12/2017 | Guo | H04L 63/1416 |
| 10,142,794 | B1* | 11/2018 | Diamanti | G06N 3/08 |
| 10,331,937 | B2* | 6/2019 | Goldberg | G06K 9/00087 |
| 2002/0157021 | A1* | 10/2002 | Sorkin | H04L 63/1441 726/4 |
| 2003/0051026 | A1* | 3/2003 | Carter | H04L 41/00 709/224 |
| 2004/0111636 | A1* | 6/2004 | Baffes | G06F 21/554 726/23 |
| 2004/0193892 | A1* | 9/2004 | Tamura | H04L 63/1458 713/182 |
| 2006/0026682 | A1* | 2/2006 | Zakas | H04L 29/06 726/22 |
| 2007/0180516 | A1* | 8/2007 | Aoki | G06F 21/554 726/17 |
| 2007/0226795 | A1* | 9/2007 | Conti | G06F 21/554 726/22 |
| 2007/0276521 | A1* | 11/2007 | Harris | A63F 13/75 700/91 |
| 2008/0168135 | A1* | 7/2008 | Redlich | G06Q 10/10 709/204 |
| 2009/0150631 | A1* | 6/2009 | Wilsey | G06F 21/78 711/163 |
| 2010/0050268 | A1* | 2/2010 | Sheymov | G06F 21/31 726/27 |
| 2010/0207721 | A1 | 8/2010 | Nakajima et al. | |
| 2011/0154438 | A1* | 6/2011 | Price | G06F 21/30 726/3 |
| 2011/0276597 | A1* | 11/2011 | Little | H04L 63/1416 707/770 |
| 2012/0151121 | A1* | 6/2012 | Braga | G06F 21/79 711/103 |
| 2013/0091539 | A1* | 4/2013 | Khurana | H04L 63/1441 726/1 |
| 2013/0097701 | A1* | 4/2013 | Moyle | H04L 63/1441 726/22 |
| 2013/0104236 | A1* | 4/2013 | Ray | H04L 63/20 726/25 |
| 2013/0111600 | A1* | 5/2013 | Guenther | G06F 21/72 726/26 |
| 2014/0075570 | A1 | 3/2014 | Hsu et al. | |
| 2014/0096229 | A1* | 4/2014 | Burns | H04L 63/1491 726/15 |
| 2014/0143404 | A1* | 5/2014 | Kennedy | H04L 67/306 709/224 |
| 2014/0143873 | A1* | 5/2014 | Stirtzinger | H04L 63/1408 726/23 |
| 2014/0201526 | A1* | 7/2014 | Burgess | G06F 21/316 713/165 |
| 2014/0215550 | A1* | 7/2014 | Adams | G06F 21/316 726/1 |
| 2015/0033306 | A1* | 1/2015 | Dickenson | H04L 63/0807 726/7 |
| 2015/0040226 | A1* | 2/2015 | Barau | G06F 11/167 726/23 |
| 2015/0264069 | A1* | 9/2015 | Beauchesne | H04L 41/06 726/23 |
| 2015/0288687 | A1* | 10/2015 | Heshmati | H04L 63/0861 726/7 |
| 2015/0317475 | A1* | 11/2015 | Aguayo Gonzalez | G06F 21/55 726/23 |
| 2015/0350914 | A1* | 12/2015 | Baxley | H04W 12/1208 726/11 |
| 2016/0014146 | A1* | 1/2016 | Nakata | H04L 12/6418 726/12 |
| 2016/0021081 | A1* | 1/2016 | Caceres | H04L 63/08 726/7 |
| 2016/0065539 | A1* | 3/2016 | Mermelstein | H04L 63/107 726/7 |
| 2016/0080403 | A1* | 3/2016 | Cunningham | H04L 63/1425 726/23 |
| 2016/0080415 | A1* | 3/2016 | Wu | H04L 63/1491 726/23 |
| 2016/0120075 | A1* | 4/2016 | Logan | H05K 9/0007 361/816 |
| 2016/0127931 | A1* | 5/2016 | Baxley | G06F 16/285 455/67.16 |
| 2016/0182543 | A1* | 6/2016 | Aabye | H04W 12/128 726/5 |
| 2016/0224777 | A1* | 8/2016 | Rebelo | G06F 21/88 |
| 2016/0275277 | A1* | 9/2016 | Huang | G06F 21/60 |
| 2016/0283715 | A1* | 9/2016 | Duke | G06F 21/566 |
| 2016/0294837 | A1* | 10/2016 | Turgeman | H04L 63/102 |
| 2016/0366161 | A1* | 12/2016 | Mehta | H04L 63/1416 |
| 2017/0070521 | A1* | 3/2017 | Bailey | G06F 16/9535 |
| 2017/0161746 | A1* | 6/2017 | Cook | H04L 9/14 |
| 2017/0310702 | A1* | 10/2017 | Chantz | G06F 21/577 |
| 2017/0359370 | A1* | 12/2017 | Humphries | H04L 63/1441 |
| 2018/0285562 | A1* | 10/2018 | Radhakrishnan | G06F 21/554 |
| 2018/0308100 | A1* | 10/2018 | Haukioja | G06Q 20/40145 |
| 2019/0020669 | A1 | 1/2019 | Glatfelter et al. | |
| 2019/0052675 | A1* | 2/2019 | Krebs | H04L 63/1416 |

OTHER PUBLICATIONS

Communication pursuant to Article 94(3) EPC for Application No. 18182208.1 dated Apr. 28, 2021, 6 pgs.

Singapore Written Opinion for Application No. 10201805558U dated Jun. 10, 2021, pp. 1-10.

* cited by examiner

MOBILE SECURITY COUNTERMEASURES

FIELD OF THE DISCLOSURE

The present disclosure relates to mobile device security.

BACKGROUND

Mobile devices, such as laptops, mobile phones, wearable computing devices, implantable devices, portable computing devices, etc., are susceptible to unauthorized users accessing data stored on the mobile devices. To illustrate, if an unauthorized user obtains (e.g., steals) a laptop that has information associated with an authorized user of the laptop, the unauthorized user may access the information and use the information for improper purposes. As a non-limiting example, the unauthorized user can steal identity information of the authorized user (e.g., identity theft).

SUMMARY

According to one implementation, a computer-implemented method includes generating, at a processor of a mobile device, a user profile for an authorized user of the mobile device based on behavior patterns associated with the authorized user. The behavior patterns are determined based on historical data indicating past user behavior of the authorized user. The computer-implemented method also includes detecting subsequent user behavior of a particular user during an attempt by the particular user to access the mobile device. For example, the subsequent user behavior may include a heart rate of the particular user, a time of day that the particular user attempts to access the mobile device, etc. The computer-implemented method also includes comparing the subsequent user behavior to the behavior patterns of the user profile to determine whether the particular user is authorized or unauthorized. In response to determining that the particular user is an unauthorized user, the computer-implemented method includes detecting activity by the unauthorized user and performing at least one countermeasure of a plurality of countermeasures in response to detecting the activity. Each countermeasure of the plurality of countermeasures has a security level and corresponds to a degree of the activity. Different countermeasures may be performed for similar scenarios. For example, for a particular degree of activity, a first particular countermeasure or a second particular countermeasure may be performed. According to one implementation, a first countermeasure having a first security level protects data stored at the mobile device from the unauthorized user. To illustrate, the first countermeasure may delete data stored at the mobile device. A second countermeasure having a second security level determines information about the unauthorized user. To illustrate, the second countermeasure may activate a camera of the mobile device to capture the surroundings of the mobile device, scan a fingerprint of the unauthorized user and compare the fingerprint to one or more fingerprint databases, etc. A third countermeasure having a third security level performs additional security measures or countermeasures. Each countermeasure is triggered by the degree of activity (e.g., improper activity) of the unauthorized user.

According to another implementation, an apparatus includes a memory that stores a user profile for an authorized user of a mobile device. The user profile is generated based on behavior patterns associated with the authorized user. The behavior patterns are determined based on historical data indicating past user behavior of the authorized user. The apparatus also includes a processor coupled to the memory. The processor is configured to detect subsequent user behavior of a particular user during an attempt by the particular user to access the mobile device. The processor is further configured to compare the subsequent user behavior to the behavior patterns of the user profile to determine whether the particular user is authorized or unauthorized. In response to a determination that the particular user is an unauthorized user, the processor is configured to detect activity by the unauthorized user and perform at least one countermeasure of a plurality of countermeasures in response to detecting the activity. Each countermeasure of the plurality of countermeasures has a security level and corresponds to a degree of the activity. Different countermeasures may be performed for similar scenarios. For example, for a particular degree of activity, a first particular countermeasure or a second particular countermeasure may be performed. According to one implementation, a first countermeasure having a first security level protects data stored at the mobile device from the unauthorized user, a second countermeasure having a second security level determines information about the unauthorized user, and a third countermeasure having a third security level performs additional security measures or countermeasures. Each countermeasure is triggered by the degree of activity (e.g., improper activity) of the unauthorized user.

According to another implementation, a computer-readable storage device includes instructions that, when executed by a processor, cause the processor to perform operations including generating a user profile for an authorized user of a mobile device based on user behavior patterns associated with the authorized user. The behavior patterns are determined based on historical data indicating past user behavior of the authorized user. The operations also include detecting subsequent user behavior of a particular user during an attempt by the particular user to access the mobile device. The operations also include comparing the subsequent user behavior to the user behavior patterns of the user profile to determine whether the particular user is authorized or unauthorized. In response to determining that the particular user is an unauthorized user, the operations include detecting activity by the unauthorized user and performing at least one countermeasure of a plurality of countermeasures in response to detecting the activity. Each countermeasure of the plurality of countermeasures has a security level and corresponds to a degree of the activity. Different countermeasures may be performed for similar scenarios. For example, for a particular degree of activity, a first particular countermeasure or a second particular countermeasure may be performed. According to one implementation, a first countermeasure having a first security level protects data stored at the mobile device from the unauthorized user, a second countermeasure having second a security level determines information about the unauthorized user, and a third countermeasure having a third security level performs additional security measures or countermeasures. Each countermeasure is triggered by the degree of activity (e.g., improper activity) of the unauthorized user.

One advantage of the above-described implementations is that a mobile device can detect that an unauthorized user has accessed the mobile device. Different countermeasures can be triggered at the mobile device based on levels of improper activity by the unauthorized user. For example, if the improper activity corresponds to a low-level security breach, the mobile device can delete data to prevent the unauthorized user from accessing the data. If the improper activity corresponds to a higher-level security breach, the mobile device can actively collect data about the unauthorized user while the mobile device is in the unauthorized user's possession. The collected data may be used to identify the location of the mobile device (and thus the location of the unauthorized user) and the collected data may be used to determine an identity of the unauthorized user. As a non-limiting example, to determine the location of the mobile device, a camera of the mobile device may be activated to capture the surroundings of the mobile device. To determine the identity of the unauthorized user, a fingerprint scanner on the mobile device may scan a fingerprint of the unauthorized user and compare the fingerprint to one or more fingerprint databases. Thus, the mobile device may perform active measures to identify and locate the unauthorized user. Additionally, the features, functions, and advantages that have been described can be achieved independently in various implementations or may be combined in yet other implementations, further details of which are disclosed with reference to the following description and drawings.

DETAILED DESCRIPTION

Figure 1:
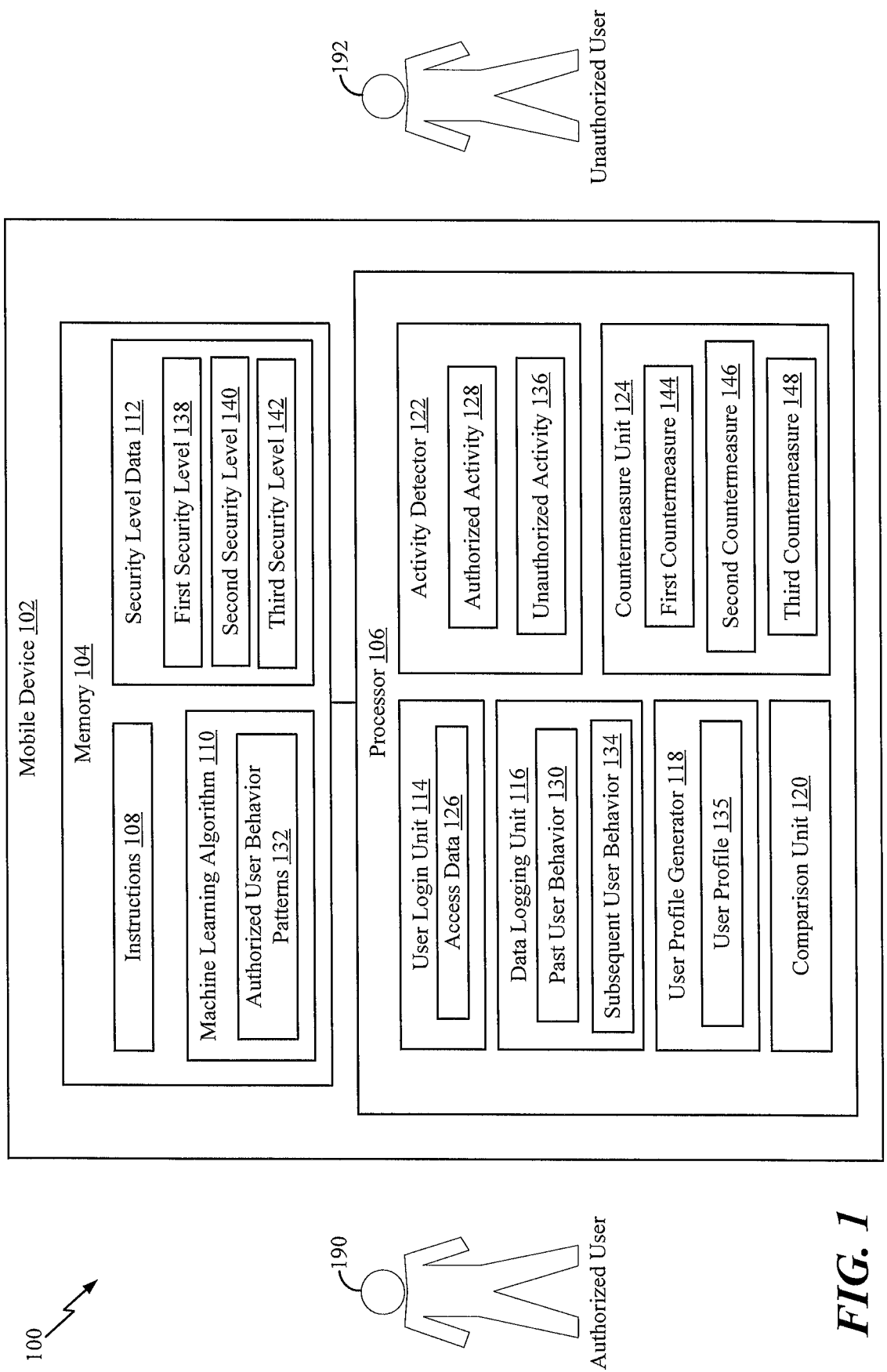
FIG. 1 is a diagram of a system that includes a mobile device operable to perform countermeasures based on a security breach.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The present disclosure describes a mobile computing security system that is implemented on a mobile device. The mobile computing security system detects unauthorized use of the mobile device by an unauthorized user (e.g., a nefarious user or "bad actor"). For example, over time, the mobile device logs behavioral information and environmental cues about an authorized user (or authorized users) of the mobile device. The mobile computing security system uses machine learning logic and algorithms to determine behavior patterns of the authorized user and develops a user profile based on the behavior patterns. In response to detecting behavior that varies from the behavior patterns of the user profile, the mobile computing security system determines that an unauthorized user is using the mobile device. For example, the mobile computing security system may determine that an unauthorized user is using the mobile device in response to detecting a variation in location of the mobile device from locations associated with the behavior patterns, a variation in detected biometric measurements (e.g., retinal scan, facial scan, galvanic skin response, heart rate etc.) of a user from biometric measurements associated with the behavior patterns, a variation in voice signature of a user from voice signatures associated with the behavior patterns, etc.

The mobile computing security system monitors activities and patterns (e.g., nefarious patterns) along with environmental and situational cues to determine a severity of a security breach by the unauthorized user. As a non-limiting example, the mobile computing security system may monitor the activities to determine whether the unauthorized user is attempting to steal identity information (e.g., a social security number) of the authorized user. Based on the severity of the security breach, the mobile computing security system performs countermeasures to protect the authorized user (e.g., protect the identity information). For example, the mobile computing security system can delete the identity information, encrypt the identity information, etc. Additionally, the mobile computing security system can generate false identity information (e.g., a fake social security number) and provide the false identity information to the unauthorized user.

According to some implementations, the mobile computing security system may gather information about the unauthorized user. As non-limiting examples, the mobile computing security system may activate a camera of the mobile device to capture a surrounding environment of the unauthorized user, record audio to receive a voice signature of the unauthorized user and transmit the voice signature over available networks (e.g., cellular networks), scan a fingerprint of the unauthorized user if the unauthorized user touches a particular portion of the mobile device, measure biometric data of the unauthorized user, spoof a wireless network using a hotspot that mines data from other mobile devices in a network range, etc.

Thus, based on the severity of the security breach, the mobile computing security system may perform active countermeasures to protect data stored at the mobile device and to obtain information about the unauthorized user. As a result, in scenarios where immediate action needs to be taken against the unauthorized user, the mobile computing security system may assist to gather information (e.g., the whereabouts and identity) associated with the unauthorized user.

FIG. 1 depicts a system 100 that includes a mobile device 102 operable to perform countermeasures based on a security breach. The mobile device 102 includes a memory 104 that is coupled to a processor 106. The memory 104 is a non-transitory computer-readable storage device that includes instructions 108. The memory 104 also stores a machine learning algorithm 110 and security level data 112. The processor 106 includes a user login unit 114, a data logging unit 116, a user profile generator 118, a comparison unit 120, an activity detector 122, and a countermeasure unit 124. The mobile device 102 may be a laptop, a mobile phone, a wearable computing device, implantable devices, a portable computing device, a computer, a tablet, a smart-wearable device, a smart router, a mobile server, etc.

The mobile device 102 is associated with (e.g., belongs to) an authorized user 190. To access data stored at the mobile device 102 and to access applications installed on the mobile device 102, the authorized user 190 provides access data 126 to the user login unit 114. According to one implementation, the access data 126 includes a personal identification number (PIN) or a user password. For example, the user login unit 114 presents a login interface to the authorized user 190, and the authorized user 190 enters the access data 126 at the login interface. The login interface may be presented via a display screen, such as a display 928 in FIG. 9. The user may enter the access data 126 via an input device, such as an input device 978 of FIG. 9 or another input device. According to other implementations, the access data 126 includes biometric data (e.g., a fingerprint scan, a retinal scan, a facial scan, etc.), voice recognition data, etc. The user login unit 114 verifies the access data 126 and, upon verification, allows the authorized user 190 to access data stored at the mobile device 102 and to access applications installed on the mobile device 102.

The activity detector 122 detects activity of the authorized user 190 (e.g., authorized activity 128) while the authorized user 190 is providing the access data 126 and while the authorized user 190 is using the mobile device 102. For example, the activity detector 122 may detect a geographical location of the mobile device 102 while the authorized user 190 is using the mobile device 102, a time when the authorized user 190 is using the mobile device 102, physical behavior patterns (e.g., heart rate, stress level, etc.) of the authorized user 190 while the authorized user 190 is using the mobile device 102, etc. According to some implementations, the authorized activity 128 also indicates data that the authorized user 190 accesses while using the mobile device 102, applications that the authorized user 190 uses, etc. For example, the authorized activity 128 may indicate websites that the authorized user 190 frequently visits, applications that the authorized user 190 frequently uses, etc.

The data logging unit 116 logs the authorized activity 128 of the authorized user 190 over time as past user behavior 130. The past user behavior 130 may be stored at the mobile device 102 or stored at a remote device (e.g., a remote device or "cloud"). The past user behavior 130 is historical data indicating past activities of the authorized user 190. The past user behavior 130 is collected over time (e.g., days, months, or years). The processor 106 uses the past user behavior 130 logged by the data logging unit 116 to determine authorized user behavior patterns 132 of the authorized user 190. For example, the processor 106 retrieves the machine learning algorithm 110 from the memory 104 and provides the past user behavior 130 as an input to the machine learning algorithm 110. The processor 106 executes the machine learning algorithm 110 to determine the authorized user behavior patterns 132. The authorized user behavior patterns 132 include geographical location patterns of the authorized user 190, mobile device usage time patterns of the authorized user 190, typing speed patterns of the authorized user 190, data-type patterns of the authorized user 190, biometric data patterns (e.g., heart rate patterns, stress level patterns, sleep patterns, etc.), and other user behavior patterns.

The user profile generator 118 generates a user profile 135 for the authorized user 190 based on the authorized user behavior patterns 132. The user profile 135 includes information that is unique to the authorized user 190 (based on past behavior and activity) and that may be used to determine whether an unauthorized user 192 has accessed (e.g., stolen) the mobile device 102, as described below. For example, the user profile 135 indicates geographical locations where the authorized user 190 has accessed the mobile device 102, geographical locations where the authorized user 190 is likely to access the mobile device 102, time periods when the authorized user 190 has accessed the mobile device 102, time periods when the authorized user 190 is likely to access the mobile device 102, physical attributes (e.g., heart-rate, stress level, etc.) of the authorized user 190, etc.

If the mobile device 102 determines that a potential unknown user is attempting to access the mobile device 102, the mobile device 102 detects subsequent user behavior 134 of the potential unknown user and compares the subsequent user behavior 134 to the authorized user behavior patterns 132 of the user profile 135. To illustrate, if the user login unit 114 determines that the access data 126 has been manipulated or falsified, the user login unit 114 may determine that a potential unknown user is attempting to access the mobile device 102. As a non-limiting example, if the access data 126 is a PIN and it takes more than ten seconds for the PIN to be entered, the user login unit 114 may determine that the access data 126 has been manipulated or falsified. Alternatively, if the typing speed at which the PIN is entered significantly differs from the typing speed of the authorized user 190 (indicated in the user profile 135), the user login unit 114 may determine that the access data 126 has been manipulated or falsified. As another non-limiting example, if the user login unit 114 detects cyber activity or cyber threats while the access data 126 is provided, the user login unit 114 may determine that the access data 126 has been manipulated or falsified. To illustrate, if the user login unit 114 determines that the access data 126 is computer-generated data, the user login unit 114 may determine that the access data 126 has been manipulated of falsified.

According to one implementation, if a particular user enters the PIN into the login unit 114 and the processor 106 determines that the particular user is not following historical norms (e.g., a typing speed historically used to enter the PIN, a login time when PIN is historically entered, a login location where the PIN is historically entered, etc.), the processor 106 may activate a camera to capture an image of the particular user. Alternatively or in addition, the processor 106 may activate a microphone to record a voice sample of the particular user. The processor 106 may compare the image, the voice sample, or both, to information associated with the authorized user 190. In response to a determination that the camera is blocked (e.g., unable to capture an image of the particular user), the processor 106 may increase a security level. For example, the processor 106 may indicate that the particular user is an unauthorized user 192 that the unauthorized user 192 is involved in improper activity.

In response to a determination that a potential unknown user has accessed the mobile device 102, the activity detector 122 may detect activity of the potential unknown user and the data logging unit 116 may log the activity as the subsequent user behavior 134. The comparison unit 120 may compare the subsequent user behavior 134 to the authorized user behavior patterns 132 of the user profile 135. If the deviation between the subsequent user behavior 134 and the authorized user behavior patterns 132 satisfies a threshold, the comparison unit 120 determines that an unauthorized user 192 has accessed the mobile device 102. As a non-limiting example, if the subsequent user behavior 134 indicates the mobile device 102 is accessed in a location that is not recognized by the authorized user behavior patterns 132 and at a time that is not consistent with access times in the authorized user behavior patterns 132, the comparison unit 120 initiates a process to determine whether an unauthorized user 192 has accessed the mobile device 102. After the process is initiated, the comparison unit 120 uses other metrics (e.g., biometric measurements) of the subsequent user behavior 134 to determine whether an unauthorized user 192 has accessed the mobile device 102. In an illustrative example, the comparison unit 120 compares the heart-rate indicated by the subsequent user behavior 134, the stress level indicated by the subsequent user behavior 134, and other biometric measurements indicated by the subsequent user behavior 134 to corresponding metrics of the authorized user behavior patterns 132 to determine whether an unauthorized user 192 has accessed the mobile device 102. According to some implementations, the activity detector 122 and the comparison unit 120 may also determine, after the login process, that an unauthorized user 192 has accessed the mobile device 102 if activity associated with the mobile device 102 significantly differs from the authorized user behavior patterns 132 of the user profile 135. The activity "significantly differs" from the authorized user behavior patterns 132 if a particular number of weighted user behavior metrics differ from corresponding metrics of the past user behavior 130 by a threshold.

In response to a determination that the unauthorized user 192 has accessed the mobile device 102, the activity detector 122 detects activity by the unauthorized user 192 (e.g., unauthorized activity 136). For example, the activity detector 122 detects whether the unauthorized user 192 is accessing data stored at the mobile device 102, detects whether the mobile device 102 is near unknown networks, detects whether the unauthorized user 192 is attempting to access identity information of the authorized user 190, etc.

The processor 106 determines a security level that the unauthorized activity 136 satisfies (e.g., breaches) and performs an appropriate countermeasure. For example, the security level data 112 includes data indicating activities associated with a breach of a first security level 138, data indicating activities associated with a breach of a second security level 140, and data indicating activities associated with a breach of a third security level 142. Although three security levels 138-142 are illustrated in FIG. 1, in other implementations, there are additional security levels. Breach of the first security level 138 corresponds to a low-level security breach, breach of the second security level 140 corresponds to a mid-level security breach, and breach of the third security level 142 corresponds to a high-level security breach. A non-limiting example of a low-level security breach includes an attempt to access data stored at the mobile device 102, and a non-limiting example of a mid-level security breach includes an attempt to steal the identity of the authorized user 190 (e.g., identity theft). High-level security breaches include other (more serious) offenses that may justify notifying law enforcement and potentially performing high-level countermeasures. The security breaches described above are merely for illustrative purposes and should not be construed as limiting.

The processor 106 determines the security levels 138-142 that are breached by the unauthorized activity 136 to determine the appropriate countermeasure to perform. For example, the countermeasure unit 124 is configured to perform a first countermeasure 144, a second countermeasure 146, and a third countermeasure 148. Although three countermeasures 144-148 are illustrated in FIG. 1, in other implementations, there are additional countermeasures.

The countermeasures may be performed sequentially based on the unauthorized activity 136. For example, if the countermeasure unit 124 determines that the unauthorized activity 136 satisfies the first security level 138, the countermeasure unit 124 performs the first countermeasure 144. As described with respect to FIGS. 2-3, the first countermeasure 144 protects information stored at the mobile device 102 from the unauthorized user 192. After the first countermeasure 144 is performed, the countermeasure unit 124 determines whether the unauthorized activity 136 satisfies the second security level 140. If the countermeasure unit 124 determines that the unauthorized activity 136 satisfies the second security level 140, the countermeasure unit 124 performs the second countermeasure 146. As described with respect to FIGS. 4-6, the second countermeasure 146 enables the mobile device to determine information associated with the unauthorized user 192. If the countermeasure unit 124 determines that the unauthorized activity 136 satisfies the third security level 142, the countermeasure unit 124 performs the third countermeasure 148.

It should be understood that the activity detector 122 may continuously monitor the unauthorized activity 136. For example, the unauthorized activity 136 may increase (or decrease) in severity and the activity detector 122 may monitor the change in severity. Thus, the second countermeasure 146, the third countermeasure 148, or both, may be triggered in response to a change in the unauthorized activity 136. Additionally, it should be understood that the countermeasures described with respect to FIGS. 2-6 are merely illustrative and should not be construed as limiting. For example, other countermeasures may be implemented. Additionally, two or more of the countermeasures described with respect to FIGS. 2-6 may be performed concurrently.

Figure 2:
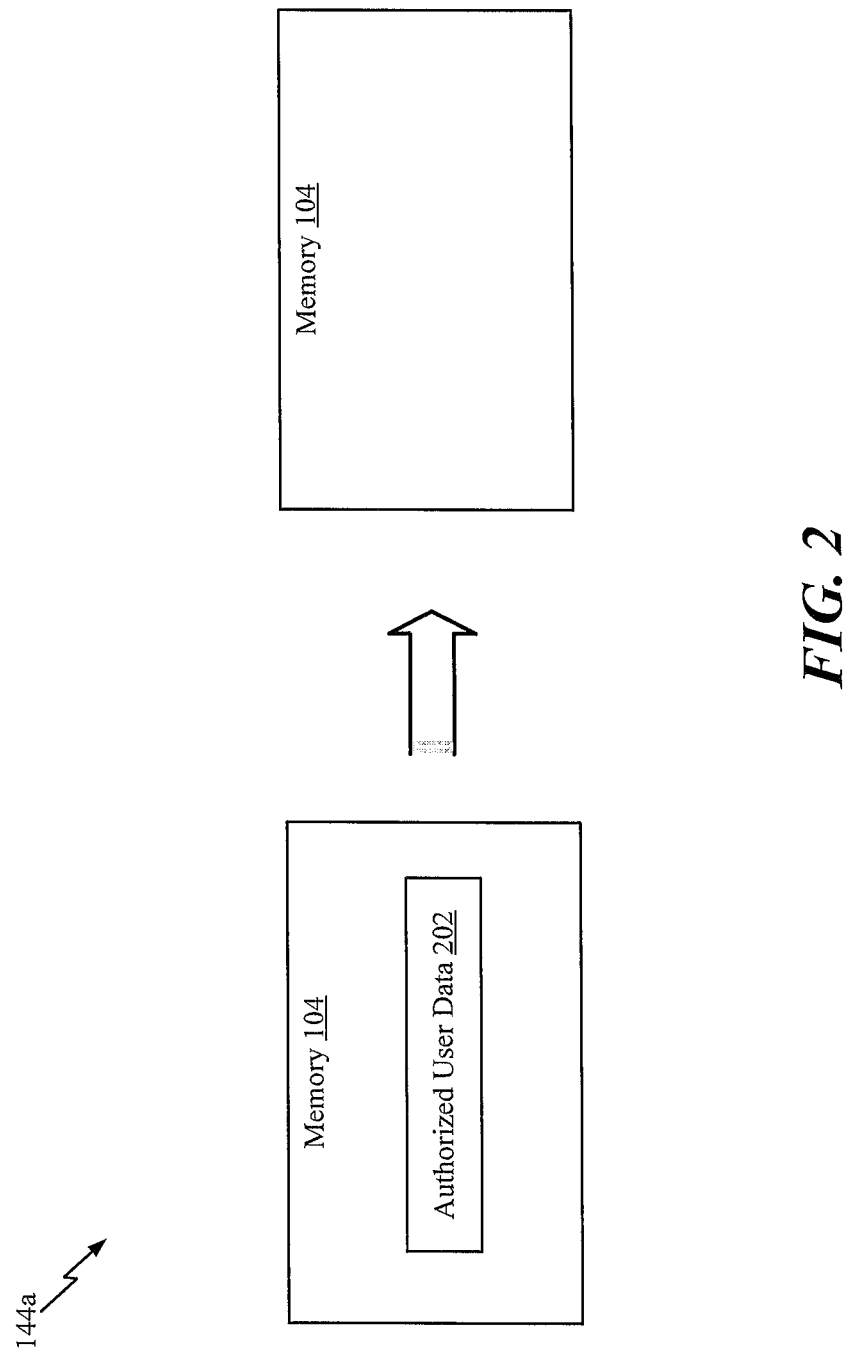
FIG. 2 depicts an example of a countermeasure that protects information stored at the mobile device from an unauthorized user.

Referring to FIG. 2, an example of a first countermeasure 144a is shown. The first countermeasure 144a is performed by the countermeasure unit 124 in response to a determination that the unauthorized activity 136 breaches the first security level 138.

The first countermeasure 144a protects information stored at the mobile device 102 from the unauthorized user 192. For example, authorized user data 202 is stored at the memory 104. In response to determining that unauthorized activity 136 satisfies the first security level 138, the countermeasure unit 124 deletes the authorized user data 202 from the memory 104, as illustrated in FIG. 2. For example, if the unauthorized activity 136 corresponds to an attempt to access data (e.g., authorized user data 202) stored at the mobile device 102, the countermeasure unit 124 deletes the authorized user data 202 from the memory 104. Thus, the first countermeasure 144a deletes the authorized user data 202 (e.g., protects the authorized user data 202 from the unauthorized user 192). In other implementations, the authorized user data 202 (or a portion of the authorized user data 202) may be encrypted, and the authorized user 190 may be notified (e.g., alerted) of the unauthorized activity 136. For example, the mobile device 102 may send an electronic message (e.g., an email) to an email address of the authorized user 190 or may send an alert to another device associated with the authorized user 190.

Figure 3:
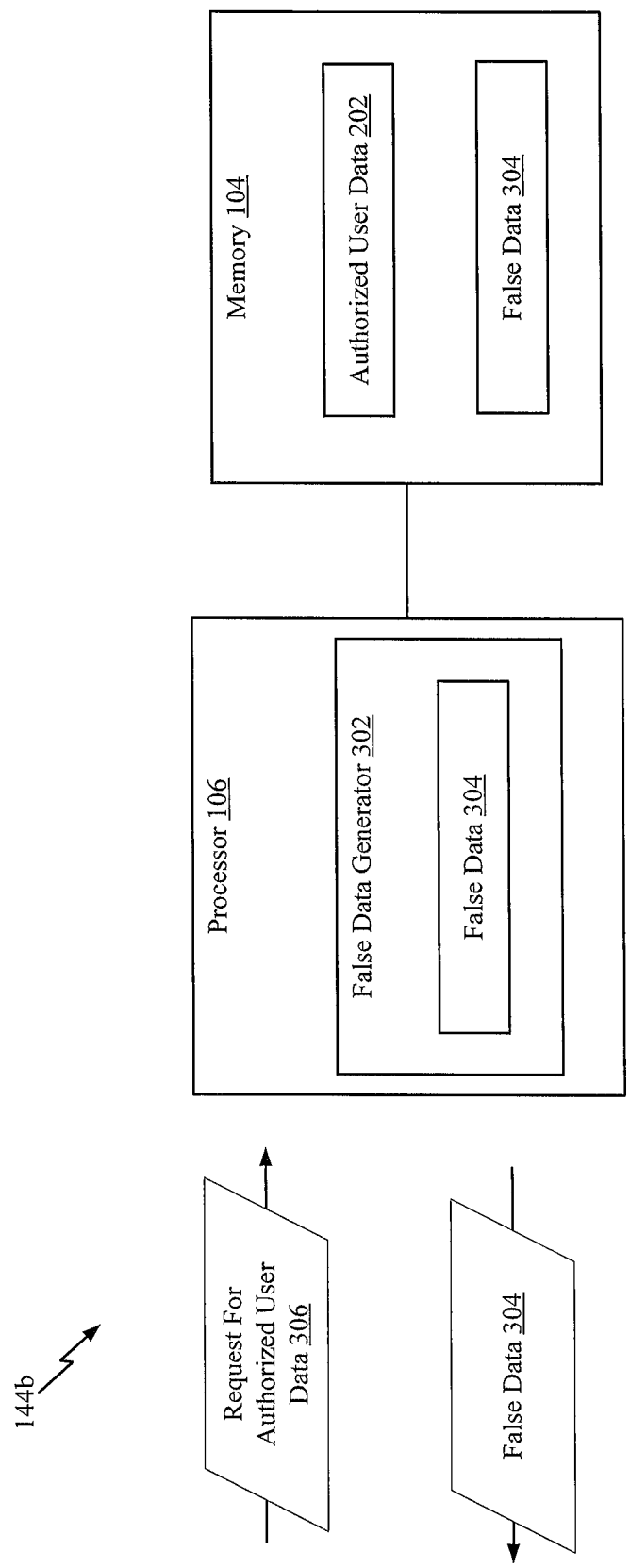
FIG. 3 depicts another example of a countermeasure that protects information stored at the mobile device from an unauthorized user.

Referring to FIG. 3, another example of a first countermeasure 144b is shown. The first countermeasure 144b is initiated by the countermeasure unit 124 in response to a determination that the unauthorized activity 136 breaches the first security level 138.

The first countermeasure 144b protects information stored at the mobile device 102 from the unauthorized user 192. For example, in the example provided in FIG. 3, the processor 106 also includes a false data generator 302. The false data generator 302 is configured to generate false data 304 that includes the same type of information as the authorized user data 202. As a non-limiting example, if the authorized user data 202 includes a birthday of the authorized user 190, the false data 304 includes a false (or fake) birthday. As another non-limiting example, if the authorized user data 202 includes a credit card number of a credit card associated with the authorized user 190, the false data 304 includes a fake credit card number that is used for fraud detection. The false data generator 304 stores the false data 304 at the memory 104.

To perform the first countermeasure 144b, the processor 106 detects a request 306 for the authorized user data 202 from the unauthorized user 192. For example, if the unauthorized user 192 attempts to access the authorized user data 202 from the memory 104, the processor 106 may receive the request 306. In response to receiving the request, the processor 106 may generate the false data 304 and provide the false data 304 to the unauthorized user 192. Thus, the first countermeasure 144b prevents the unauthorized user 192 from receiving the authorized user data 202 (e.g., protects the authorized user data 202 from the unauthorized user 192). Additionally, upon use by the unauthorized user 192, the false data 304 may notify other parties of activities by the unauthorized user 192. For example, a bank or other financial entity may be notified if the unauthorized user 192 uses the fake credit card number.

Figure 4:
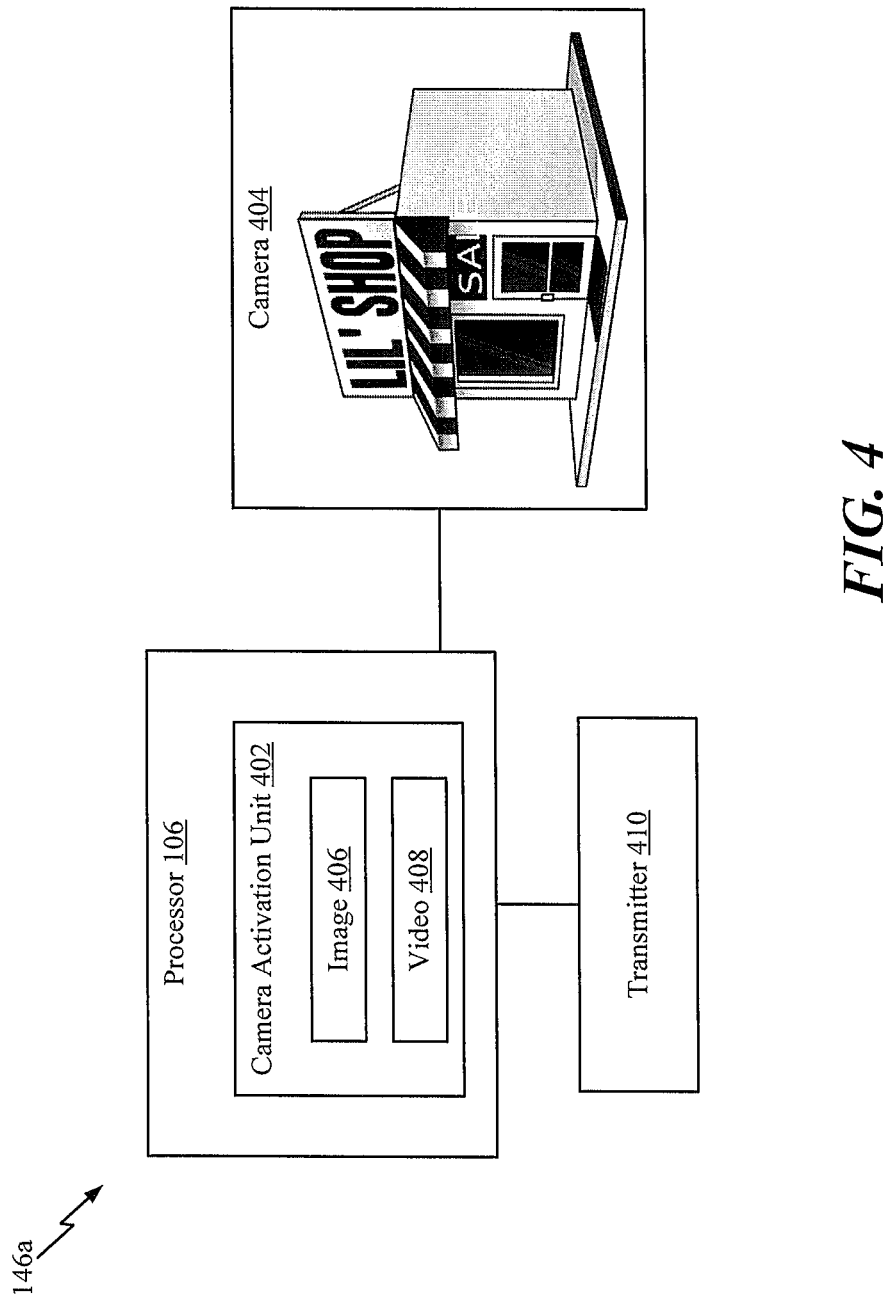
FIG. 4 depicts an example of a countermeasure that enables the mobile device to determine information associated with an unauthorized user.

Referring to FIG. 4, an example of a second countermeasure 146a is shown. The second countermeasure 146a is initiated by the countermeasure unit 124 in response to a determination that the unauthorized activity 136 breaches the second security level 140. It should be understood that the first countermeasure 144 may be performed (to protect information stored at the mobile device 102 from the unauthorized user 192) prior to performance of the second countermeasure 146a.

The second countermeasure 146a enables the mobile device 102 to determine information associated with the unauthorized user 192. For example, performing the second countermeasure 146a includes activating a camera 404 of the mobile device 102 to determine a surrounding environment of the unauthorized user 192. To illustrate, in the example provided in FIG. 4, the processor 106 also includes a camera activation unit 402. The camera 404 is coupled to the processor 106, and a transmitter 410 is coupled to the processor 106. The camera activation unit 402 activates the camera 404, and the camera 404 captures an image 406 (or video 408) of the surrounding environment of the unauthorized user 192. The transmitter 410 transmits the image 406 (or video 408) of the surrounding environment to appropriate authorities to assist in locating the unauthorized user 192. For example, the transmitter 410 may transmit the image 406 to local police enforcement or national intelligence or investigative agencies or bureaus. Additionally, the processor 106 may determine global positioning system (GPS) coordinates of the mobile device 102 when the image 406 is captured. The GPS coordinates may also be transmitted to the appropriate authorities to determine the location of the unauthorized user 192. Thus, the second countermeasure 146a enables the mobile device to determine location information associated with the unauthorized user 192 by capturing the image 406 of the surrounding environment.

Additionally, the camera activation unit 402 may activate the camera 404 in such a manner that the camera 404 captures an image of the unauthorized user's 192 face. The transmitter 410 may transmit the image to the above-mentioned authorities, and the above-mentioned authorities may perform facial recognition to determine the identity of the unauthorized user 192.

Figure 5:
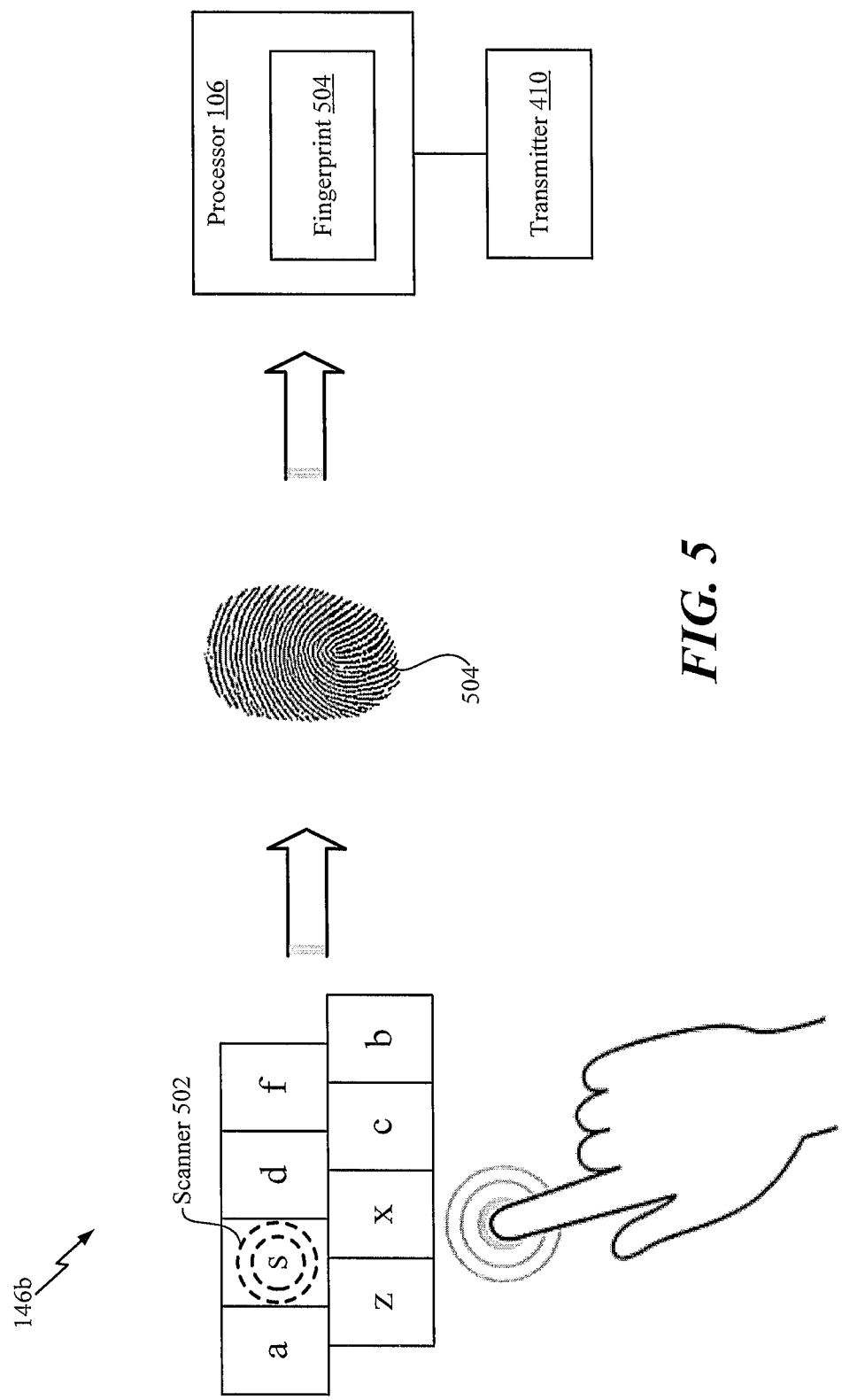
FIG. 5 depicts another example of a countermeasure that enables the mobile device to determine information associated with an unauthorized user.

Referring to FIG. 5, another example of a second countermeasure 146b is shown. The second countermeasure 146b is initiated by the countermeasure unit 124 in response to a determination that the unauthorized activity 136 breaches the second security level 140. It should be understood that the first countermeasure 144 may be performed (to protect information stored at the mobile device 102 from the unauthorized user 192) prior to performance of the second countermeasure 146b.

The second countermeasure 146b enables the mobile device 102 to determine information (e.g., identify information) about the unauthorized user 192. For example, the processor 106 may prompt the unauthorized user 192 to touch a particular portion of the mobile device 102 that includes a scanner 502. The scanner may be integrated into an input device or keypad, such as the input device 978 of FIG. 9. In the example provided in FIG. 5, the "s" key on a keyboard of the mobile device 102 includes the scanner 502. According to one implementation, the scanner 502 is not readily visible to the human eye. The processor 106 may generate a prompt that commands the unauthorized user 192 to press and hold the "s" key. As a non-limiting example, the prompt instructs the unauthorized user 192 to press and hold the "s" key for five seconds in order to open a particular application. While the unauthorized user 192 is pressing the "s" key, the scanner 502 scans a fingerprint 504 of the unauthorized user 192.

After the fingerprint 504 is scanned, an identification of the unauthorized user 192 is determined based on the fingerprint 504. According to one implementation, the transmitter 410 sends the fingerprint 504 to the above-mentioned authorities to assist the authorities in identifying the unauthorized user 192. According to another implementation, the processor 106 accesses one or more fingerprint databases (stored at the mobile device 102 or stored at a remote server) and compares the fingerprint 504 to fingerprints in the databases. If a match is determined, the processor 106 determines the identity of the unauthorized user 192, and the transmitter 410 sends information associated with the identity to the appropriate authorities. Thus, the second countermeasure 146b enables the mobile device to determine the identity of the unauthorized user 192 by prompting the unauthorized user 192 to touch the scanner 502 without the unauthorized user 192 knowing and "secretly" scanning the fingerprint 504 of the unauthorized user 192.

Figure 6:
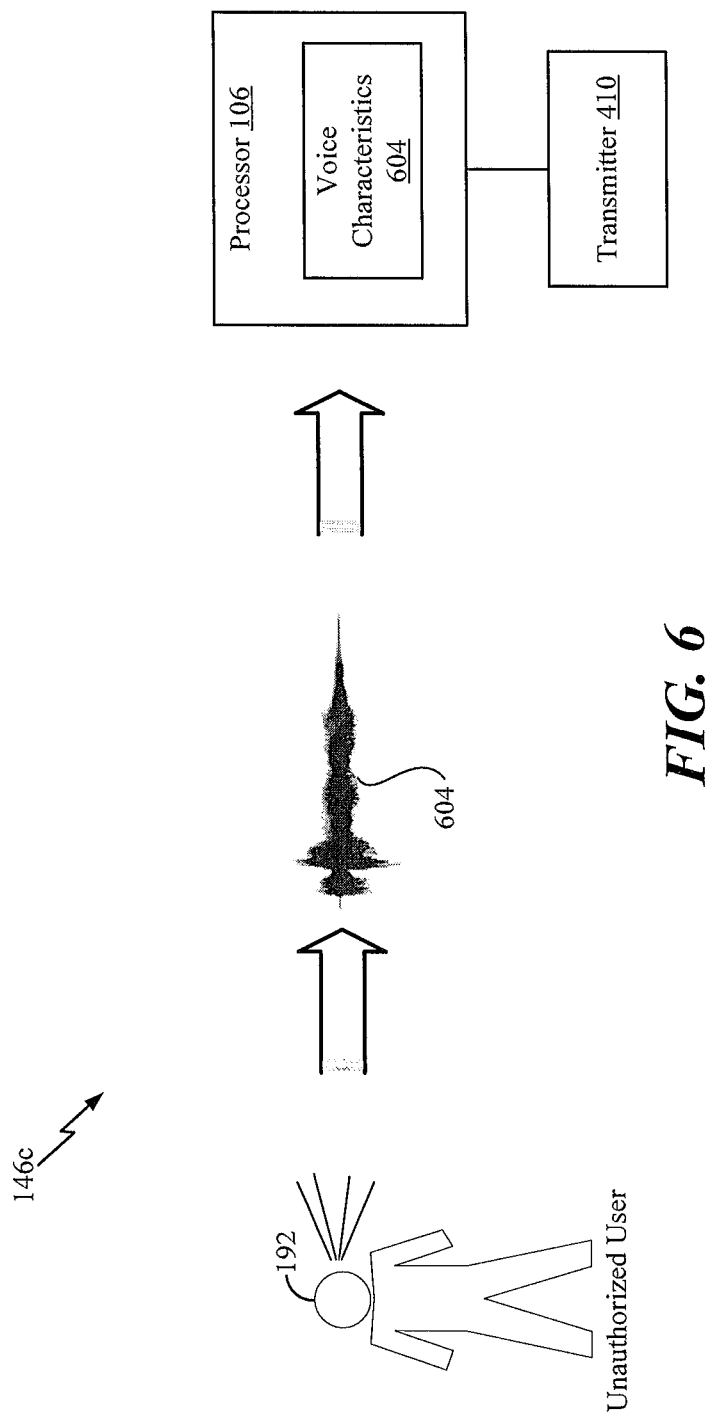
FIG. 6 depicts another example of a countermeasure that enables the mobile device to determine information associated with an unauthorized user.

Referring to FIG. 6, another example of a second countermeasure 146c is shown. The second countermeasure 146c is initiated by the countermeasure unit 124 in response to a determination that the unauthorized activity 136 breaches the second security level 140. It should be understood that the first countermeasure 144 may be performed (to protect information stored at the mobile device 102 from the unauthorized user 192) prior to performance of the second countermeasure 146c.

The second countermeasure 146c enables the mobile device 102 to determine information (e.g., identify information) about the unauthorized user 192. For example, the processor 106 may prompt the unauthorized user 192 to speak into a microphone of the mobile device 102. The processor 106 may generate voice characteristics 604 (e.g., a voice signature) of the unauthorized user 192 while the unauthorized user 192 speaks into the microphone.

After the voice characteristics 604 are generated, an identification of the unauthorized user 192 is determined based on the voice characteristics 604. According to one implementation, the transmitter 410 sends the voice characteristics 604 to the above-mentioned authorities to assist the authorities in identifying the unauthorized user 192. According to another implementation, the processor 106 accesses one or more voice databases and compares the voice characteristics 604 to voices in the databases. If a match is determined, the processor 106 determines the identity of the unauthorized user 192, and the transmitter 410 sends information associated with the identity to the appropriate authorities. Thus, the second countermeasure 146c enables the mobile device to determine the identity of the unauthorized user 192 by prompting the unauthorized user 192 to speak and "secretly" generating the voice signature 604 of the unauthorized user 192.

The second countermeasure 146a-146c described with respect to FIGS. 4-6 may be performed while false data (e.g., the false data 304 of FIG. 3) is provided to the unauthorized user 192. For example, the unauthorized user 192 may issue commands, and the mobile device 102 may provide the false data 304 in response to the commands to further engage the unauthorized user 192. While the mobile device 102 is engaging the unauthorized user 192 with the false data 304, the mobile device 102 also generates information about the unauthorized user 192, as described with respect to FIGS. 4-6. The second countermeasure 146 may also include executing instructions that enable tracing of the unauthorized user 192.

The techniques described with respect to FIGS. 1-6 enable the mobile device 102 to actively collect data about the unauthorized user 192 while the mobile device 102 is in the unauthorized user's 192 possession. The data is used to identify the whereabouts of the unauthorized user 192 and the identity of the unauthorized user 192. As a non-limiting example, to determine the whereabouts of the unauthorized user 192, the camera 404 is activated to capture the surroundings of the unauthorized user 192 and the processor 106 determines GPS coordinates of the mobile device 102. To determine the identity of the unauthorized user 192, the hidden fingerprint scanner 502 scans the fingerprint 504 and compares the fingerprint 504 to one or more fingerprint databases. Thus, the mobile device 102 may perform active measures to identify and locate the unauthorized user 192.

Figure 7:
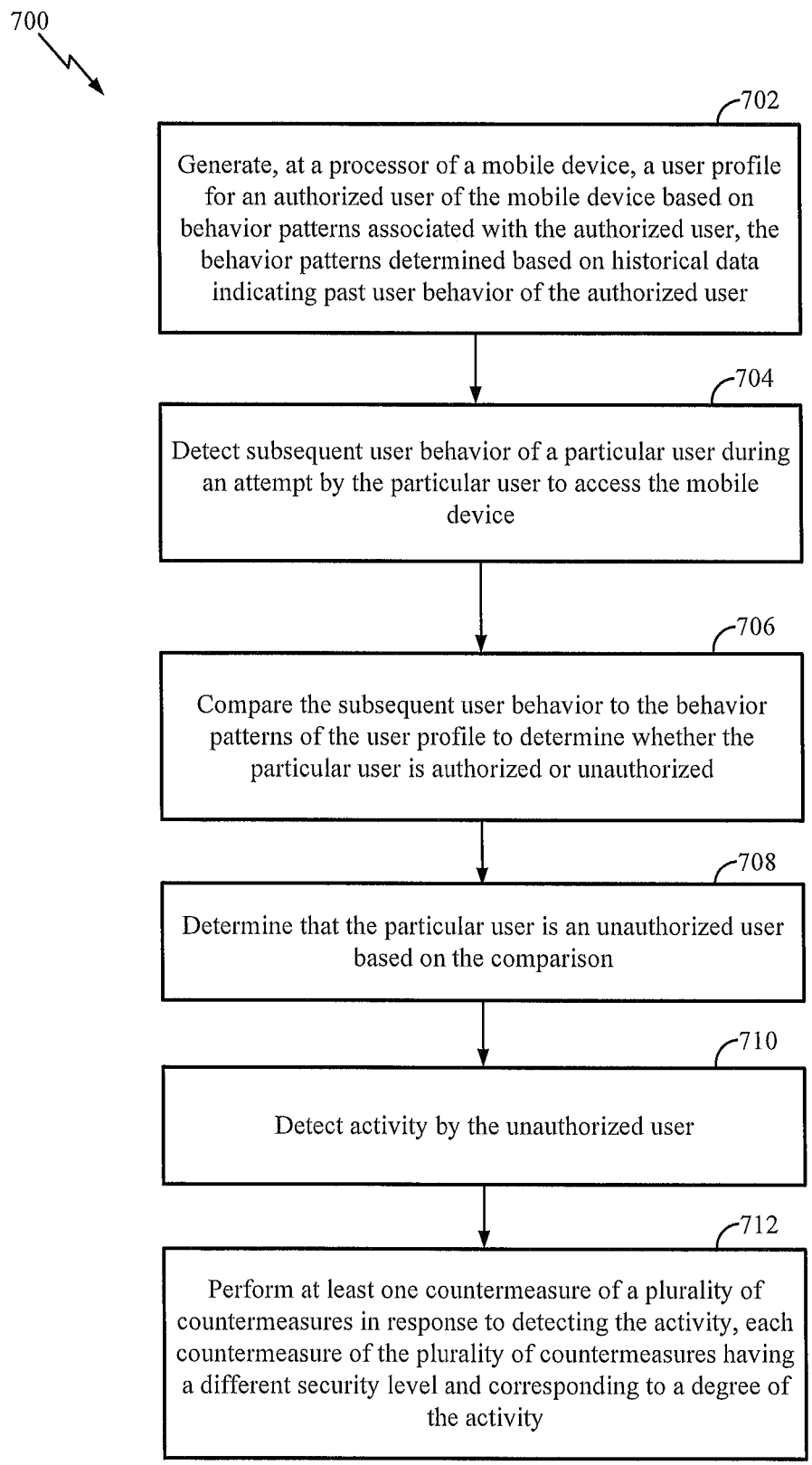
FIG. 7 is a flowchart depicting a method of performing countermeasures based on a security breach.

Referring to FIG. 7, a method 700 for performing countermeasures based on a security breach is shown. The method 700 is performed by the mobile device 102 of FIG. 1.

The method 700 includes generating, at a processor of a mobile device, a user profile for an authorized user of the mobile device based on a plurality of authorized user behavior patterns associated with the authorized user, at 702. The plurality of authorized user behavior patterns is determined based on historical data indicating past user behavior of the authorized user. The historical data includes geographical locations where the authorized user accesses the mobile device, time periods when the authorized user accesses the mobile device, physical behavior patterns of the authorized user, or a combination thereof. For example, referring to FIG. 1, the user profile generator 118 generates the user profile 135 for the authorized user 190 based on the authorized user behavior patterns 132. The authorized user behavior patterns are determined using machine learning based on the historical data. The user profile 135 includes information that is unique to the authorized user 190 (based on past behavior and activity) and that may be used to determine whether an unauthorized user 192 has accessed (e.g., stolen) the mobile device 102. For example, the user profile 135 indicates geographical locations where the authorized user 190 has accessed the mobile device 102, geographical locations where the authorized user 190 is likely to access the mobile device 102, time periods when the authorized user 190 has accessed the mobile device 102, time period when the authorized user 190 is likely to access the mobile device 102, physical behavior patterns of the authorized user 190, etc.

The method 700 also includes detecting subsequent user behavior of a particular user during an attempt by the particular user to access the mobile device, at 704. For example, referring to FIG. 1, if the user login unit 114 determines that the access data 126 has been manipulated or falsified, the user login unit 114 determines that a potential unknown user is attempting to access the mobile device 102. As a non-limiting example, if the access data 126 is a PIN and it takes more than ten seconds for the PIN to be entered, the user login unit 114 may determine that the access data 126 has been manipulated or falsified. As another non-limiting example, if the user login unit 114 detects cyber activity or cyber threats while the access data 126 is provided, the user login unit 114 may determine that the access data 126 has been manipulated or falsified. In response to a determination by the user login unit 114 that a potential unknown user has accessed the mobile device 102, the activity detector 122 may detect activity of the potential unknown user and the data logging unit 116 may log the activity as the subsequent user behavior 134.

The method 700 also includes comparing the subsequent user behavior to the plurality of authorized user behavior patterns of the user profile to determine whether the particular user is the authorized user or an unauthorized user, at 706. For example, referring to FIG. 1, the comparison unit 120 compares the subsequent user behavior 134 to the authorized user behavior patterns 132 of the user profile 135. If the deviation between the subsequent user behavior 134 and the authorized user behavior patterns 132 satisfies a threshold, the comparison unit 120 determines that an unauthorized user 192 has accessed the mobile device 102. As a non-limiting example, if the subsequent user behavior 134 indicate the mobile device 102 is accessed in a location that is not recognized by the authorized user behavior patterns 132 and at a time that is not consistent with access times in the authorized user behavior patterns 132, the comparison unit 120 determines that the unauthorized user 192 has accessed the mobile device 102.

The method 700 also includes determining that the particular user is the unauthorized user based on the comparison, at 708. The method 700 also includes detecting activity by the unauthorized user, at 710. For example, referring to FIG. 1, in response to a determination that the unauthorized user 192 has accessed the mobile device 102, the activity detector 122 detects activity by the unauthorized user 192 (e.g., unauthorized activity 136). To illustrate, the activity detector 122 detects whether the unauthorized user 192 is accessing data stored at the mobile device 102, detects whether the mobile device 102 is near strange networks (e g, unknown wireless networks), detects whether the unauthorized user 192 is attempting to steal the identity of the authorized user 190, detects whether the unauthorized user 192 is communicating with parties on a wanted list, etc.

The method 700 also includes performing at least one countermeasure of a plurality of countermeasures in response to detecting the activity, at 712. Each countermeasure of the plurality of countermeasures has a different security level and corresponds to a degree of the activity. For example, referring to FIG. 1, the countermeasure unit 124 may initiate performance of at least one countermeasure. According to the method 700, performing the at least one counter measure includes determining that the detected activity 136 satisfies the first security level 138 and performing the first countermeasure 144 of the plurality of countermeasures in response to determining the detected activity 136 satisfies the first security level 138. The first countermeasure 144 protects information stored at the mobile device 102 from the unauthorized user 192, as described with respect to FIGS. 2-3.

According to the method 700, performing the at least one countermeasure also includes determining that the detected activity 136 satisfies the second security level 140 and performing the second countermeasure 146 of the plurality of countermeasures in response to determining the detected activity 136 satisfies the second security level 140. The second countermeasure 146 enables the mobile device 102 to determine information associated with the unauthorized user 192, as described with respect to FIGS. 4-6.

The method 700 of FIG. 7 enables the mobile device 102 to actively collect data about the unauthorized user 192 while the mobile device 102 is in the unauthorized user's 192 possession. The data is used to identify the whereabouts of the unauthorized user 192 and the identity of the unauthorized user 192. As a non-limiting example, to determine the whereabouts of the unauthorized user 192, the camera 404 is activated to capture the surroundings of the unauthorized user 192 and the processor 106 determines GPS coordinates of the mobile device 102. To determine the identity of the unauthorized user 192, the hidden fingerprint scanner 502 scans the fingerprint 504 and compares the fingerprint 504 to one or more fingerprint databases. Thus, the mobile device 102 may perform active measures to identify and locate the unauthorized user 192.

Figure 8:
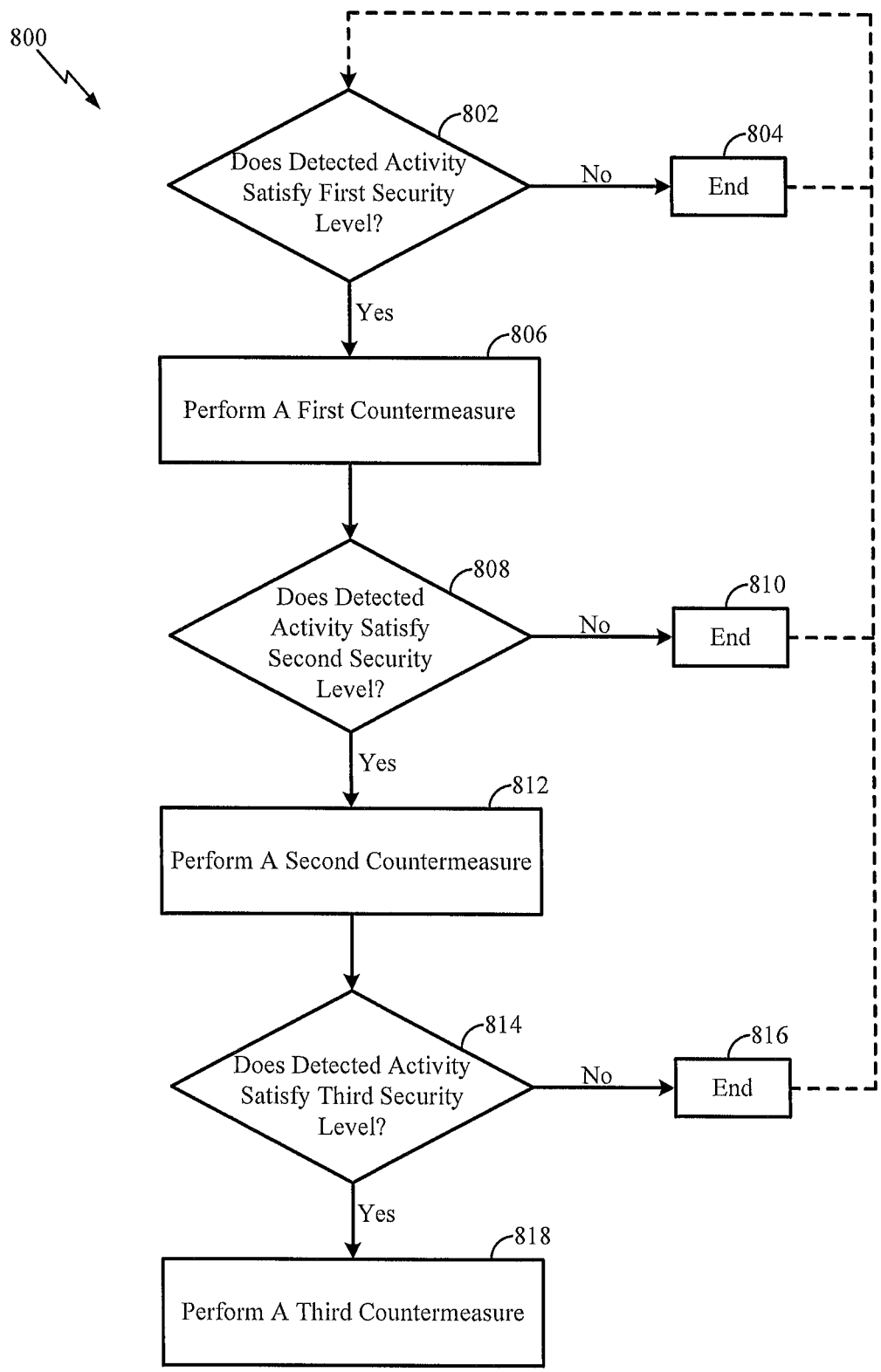
FIG. 8 is a flowchart depicting another method of performing countermeasures based on a security breach.

Referring to FIG. 8, another method 800 for performing countermeasures based on a security breach is shown. The method 800 is performed by the mobile device 102 of FIG. 1. In particular, the method 800 is performed by the countermeasure unit 124 of FIG. 1, the processor of FIG. 1, and the activity detector 122 of FIG. 1.

At 802, the countermeasure unit 124 determines whether the detected activity 136 satisfies the first security level 138. If the detected activity 136 does not satisfy the first security level 138, the method 800 ends, at 804. It should be understood however that the detected activity 136 is continuously monitored if the method 800 ends and a further determination at 802 may be performed if the security level associated with the detected activity 136 increases. If the detected activity 136 satisfies the first security level 138, the countermeasure unit 124 performs the first countermeasure 144, at 806.

After the first countermeasure 144 is performed, the countermeasure unit 124 determines whether the detected activity 136 satisfies the second security level 140, at 808. If the detected activity 136 does not satisfy the second security level 140, the method 800 ends, at 810. It should be understood however that the detected activity 136 is continuously monitored if the method 800 ends and a further determination at 802 may be performed if the security level associated with the detected activity 136 increases. If the detected activity 136 satisfies the second security level 140, the countermeasure unit 124 performs the second countermeasure 146, at 812.

After the second countermeasure 146 is performed, the countermeasure unit 124 determines whether the detected activity 136 satisfies the third security level 142, at 814. If the detected activity 136 does not satisfy the third security level 142, the method 800 ends, at 816. It should be understood however that the detected activity 136 is continuously monitored if the method 800 ends and a further determination at 802 or 808 may be performed if the security level associated with the detected activity 136 increases. If the detected activity 136 satisfies the third security level 142, the countermeasure unit 124 performs the third countermeasure 148, at 818. The third countermeasure 148 may include more serious countermeasures and usually notification of involve law enforcement.

Figure 9:
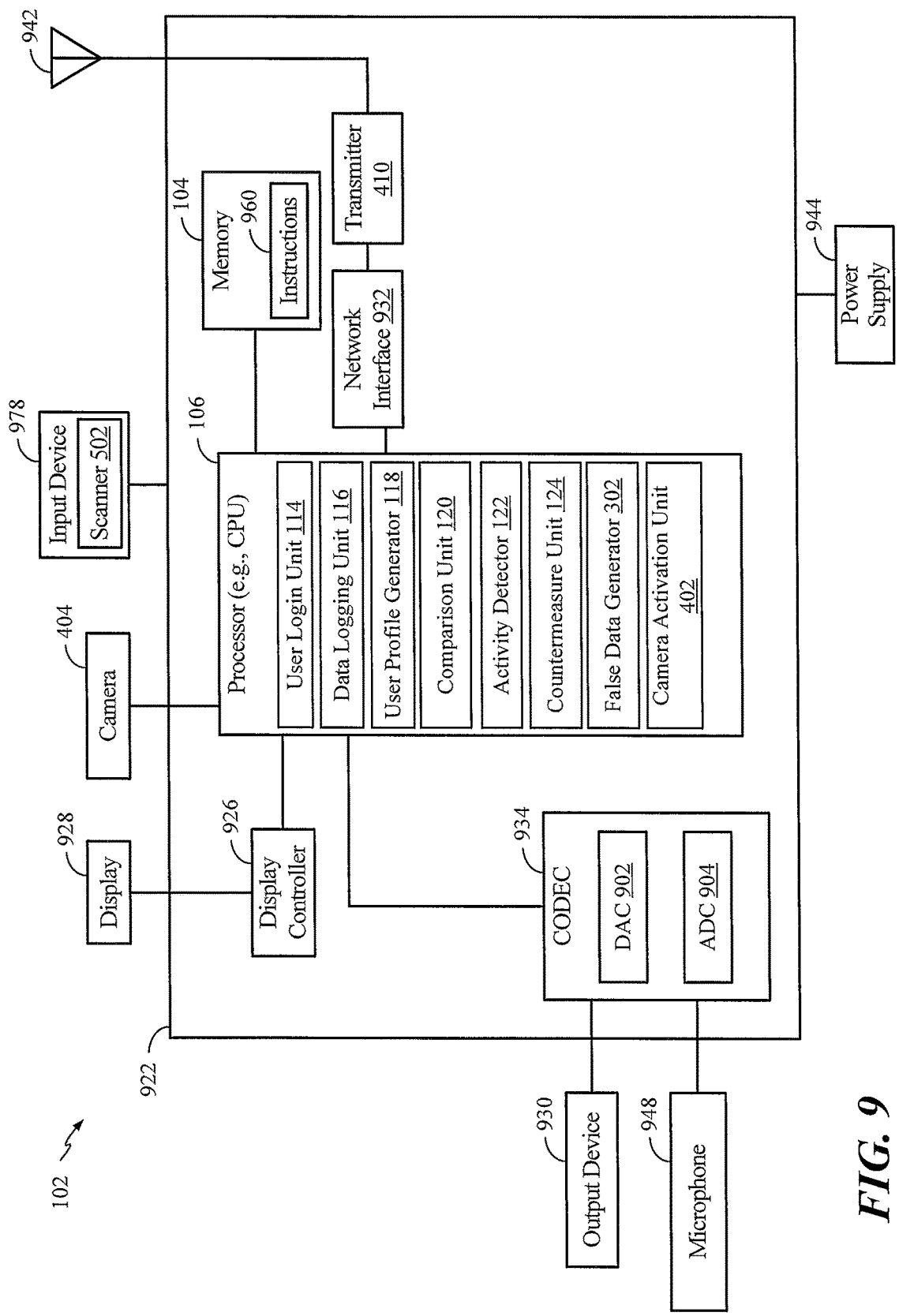
FIG. 9 depicts an example of a mobile device operable to perform countermeasures based on a security breach.

Referring to FIG. 9, a block diagram of the mobile device 102 is shown. In various implementations, the mobile device 102 may have more or fewer components than illustrated in FIG. 9.

In a particular implementation, the mobile device 102 includes the processor 106, such as a central processing unit (CPU), coupled to the memory 104. The memory 104 includes instructions 960 (e.g., executable instructions) such as computer-readable instructions or processor-readable instructions. The instructions 960 may include one or more instructions that are executable by a computer, such as the processor 106.

FIG. 9 also illustrates that a network interface 932, such as a wireless controller, and the transmitter 410 are coupled to the processor 106 and to an antenna 942. The processor 106 includes the user login unit 114, the data logging unit 116, the user profile generator 118, the comparison unit 120, the activity detector 122, the countermeasure unit 124, the false data generator 302, and the camera activation unit 402.

The mobile device 102 may include a display controller 926 that is coupled to the processor 106 and to a display 928. A coder/decoder (CODEC) 934 may also be coupled to the processor 106. An output device 930 (e.g., one or more loudspeakers) and a microphone 948 may be coupled to the CODEC 934. The CODEC 934 may include a digital-to-analog converter (DAC) 902 and an analog-to-digital converter (ADC) 904.

In some implementations, the processor 106, the display controller 926, the memory 104, the CODEC 934, the network interface 932, and the transmitter 410 are included in a system-in-package or system-on-chip device 922. In some implementations, an input device 978 and a power supply 944 are coupled to the system-on-chip device 922. The input device 978 includes the scanner 502. Moreover, in a particular implementation, as illustrated in FIG. 9, the display 928, the input device 978, the output device 930, the microphone 948, the camera 404, the antenna 942, and the power supply 944 are external to the system-on-chip device 922.

In an illustrative implementation, the memory 104 includes or stores the instructions 960 (e.g., executable instructions), such as computer-readable instructions or processor-readable instructions. For example, the memory 104 may include or correspond to a non-transitory computer readable medium storing the instructions 960. The instructions 960 may include one or more instructions that are executable by a computer, such as the processor 106. The instructions 960 may cause the processor 106 to perform the method 700 of FIG. 7, the method 800 of FIG. 8, or both.

Figure 10:
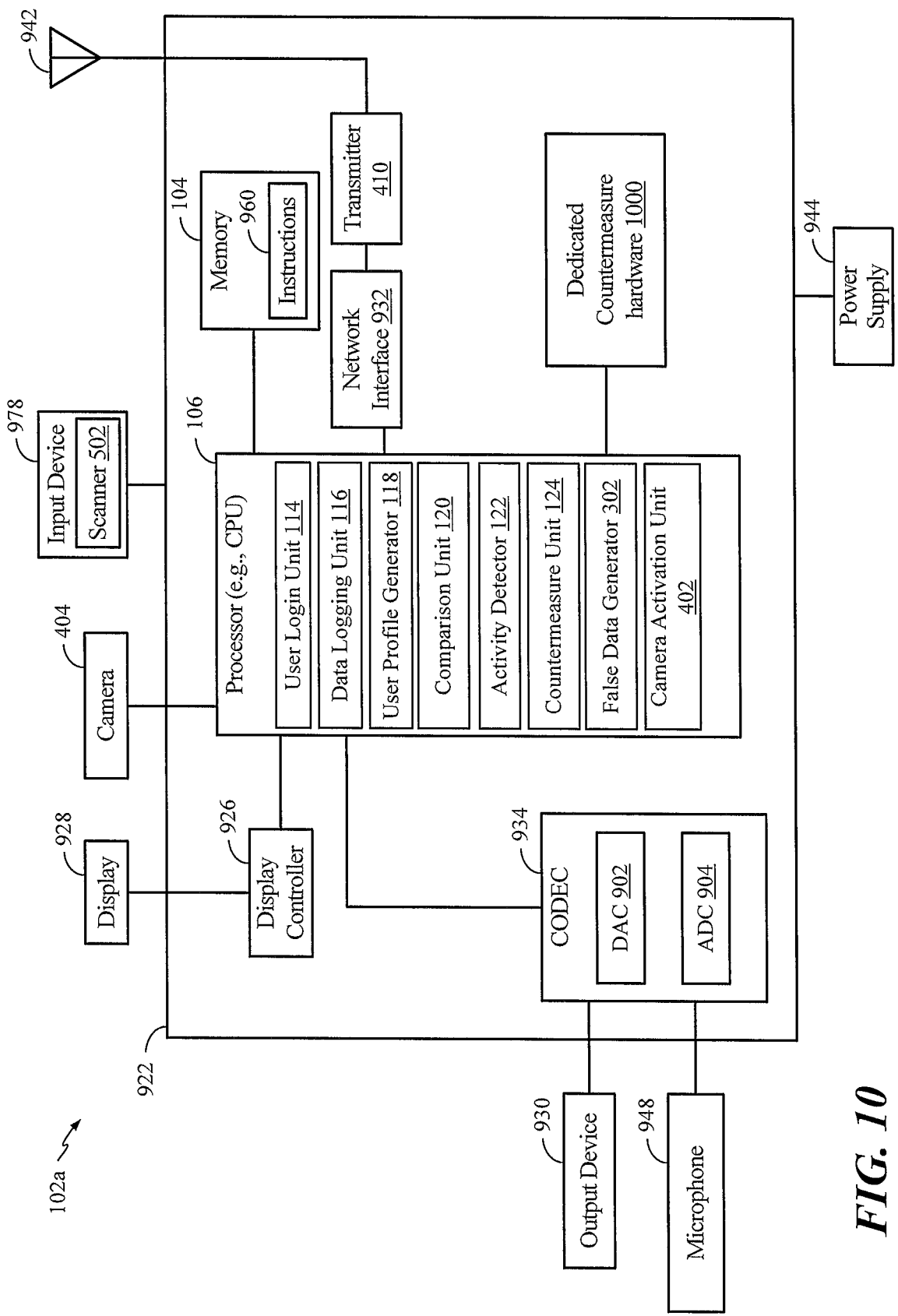
FIG. 10 depicts another example of a mobile device operable to perform countermeasures based on a security breach.

Referring to FIG. 10, another implementation of the mobile device 102 is shown and designated as 102*a*. The mobile device 102*a* is substantially similar to the mobile device 102 of FIG. 9. However, the mobile device 102*a* has dedicated countermeasure hardware 1000 that is coupled to the processor 106. The dedicated countermeasure hardware 1000 may be configured to perform more serious countermeasures (e.g., the third countermeasure 148 or other more serious countermeasures).

For example, in response to a determination that the unauthorized activity 136 satisfies the third security level, the dedicated countermeasure hardware 1000 may generate one or more jamming signals, generate an electromagnetic pulse (EMP), may generate an electrical shocking signal, destroy read-only memories (e.g., flash drives) at the mobile device 102*a*, arm the mobile device 102*a*, etc. According to one implementation, the dedicated countermeasure hardware 1000 may include a self-destruct processor (not shown) that destroys a non-volatile memory. The dedicated countermeasure hardware 1000 may be integrated into dedicated defensive devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. A storage device is not a signal.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A computer-implemented method comprising:
   generating, at a processor of a mobile device, a user profile for an authorized user of the mobile device based on behavior patterns associated with the authorized user, the behavior patterns determined based on historical data indicating past user behavior of the authorized user, wherein the behavior patterns comprise mobile device usage time patterns of the authorized user;
   detecting subsequent user behavior of a particular user attempting to gain access to the mobile device by a login process; and
   responsive to determining that the particular user is a potential unauthorized user based on a comparison of first metrics of the behavior patterns of the user profile to second metrics of the subsequent user behavior during the login process and responsive to granting access to the mobile device based on the login process:
      detecting activity by the potential unauthorized user after access to the mobile device has been granted;
      determining a security level being violated by the activity, wherein a first security level is associated with a first post-access activity by the potential unauthorized user, wherein a second security level is associated with a second post-access activity by the potential unauthorized user, and wherein the first post-access activity is distinct from the second post-access activity;
      selecting a particular countermeasure of a plurality of countermeasures based on the security level, wherein the plurality of countermeasures comprise a first countermeasure to be performed responsive to the first security level being violated and a second countermeasure to be performed responsive to the second security level being violated, and wherein the first countermeasure and the second countermeasure are distinct, wherein the first countermeasure comprises:
         prompting the potential unauthorized user to touch a particular portion of the mobile device, the particular portion of the mobile device comprising a scanner;
         scanning a fingerprint of the potential unauthorized user while the unauthorized potential user touches the particular portion of the mobile device; and
         transmitting identity data based on the fingerprint to a second device;
      wherein the second countermeasure comprises:
         providing false data in response to commands issued by the potential unauthorized user to engage the potential unauthorized user with the mobile device; and
         generating information about the potential unauthorized user while the potential unauthorized user is engaged with the mobile device, the information including the fingerprint of the potential unauthorized user, a voice signature of the potential unauthorized user, or both; and
      performing the particular countermeasure.

2. The computer-implemented method of claim 1, further comprising:

detecting second subsequent user behavior of a second particular user during an attempt by the second particular user to access the mobile device;

performing a second comparison of the second subsequent user behavior to the behavior patterns of the user profile to determine whether the second particular user is authorized or unauthorized; and responsive to determining that the second particular user is a second unauthorized user based on the second comparison:

detecting second activity by the second unauthorized user, the second activity distinct from the activity;

determining the second security level being violated by the second activity;

selecting a second particular countermeasure of the plurality of countermeasures based on the second security level; and performing the second particular countermeasure.

3. The computer-implemented method of claim 1, wherein the first security level corresponds to unauthorized access of data stored on the mobile device, and wherein the second security level corresponds to identity theft.

4. The computer-implemented method of claim 1, wherein the plurality of countermeasures comprises a third countermeasure to be performed responsive to a third security level being violated.

5. The computer-implemented method of claim 4, wherein the third countermeasure comprises deleting data stored at the mobile device.

6. The computer-implemented method of claim 4, wherein the third countermeasure comprises:

detecting a request for identity information from the potential unauthorized user, the identity information associated with the authorized user;

generating false identity information in response to detecting the request; and providing the false identity information to the potential unauthorized user.

7. The computer-implemented method of claim 4, wherein the third countermeasure enables the mobile device to determine information associated with the potential unauthorized user.

8. The computer-implemented method of claim 7, wherein performing the third countermeasure comprises generating the voice signature of the potential unauthorized user while the potential unauthorized user speaks into a microphone.

9. The computer-implemented method of claim 4, wherein performing the third countermeasure comprises activating a camera of the mobile device.

10. The computer-implemented method of claim 4, wherein the third countermeasure comprises sending a message to an account associated with the authorized user.

11. The computer-implemented method of claim 4, wherein the third countermeasure comprises initiating a self-destruct processor to destroy a non-volatile memory.

12. The computer-implemented method of claim 11, wherein the third countermeasure is associated with a third security level corresponding with to detecting criminal activity.

13. The computer-implemented method of claim 1, wherein the historical data includes physical behavior patterns of the authorized user.

14. The computer-implemented method of claim 1, wherein the historical data includes geographical locations where the authorized user accesses the mobile device.

15. The computer-implemented method of claim 1, wherein the determination that the particular user is a potential unauthorized user is generated responsive to the comparison indicating that access data has been manipulated or falsified.

16. An apparatus comprising:

a memory storing a user profile for an authorized user of a mobile device, the user profile generated based on behavior patterns associated with the authorized user, the behavior patterns determined based on historical data indicating past user behavior of the authorized user, wherein the behavior patterns comprise mobile device usage time patterns of the authorized user;

a processor coupled to the memory, the processor configured to:

detect subsequent user behavior of a particular user attempting to gain access the mobile device by a login process; and in response to a determination that the particular user is a potential unauthorized user based on a weighted comparison of first metrics of the behavior patterns of the user profile to second metrics of the subsequent user behavior during the login process and responsive to granting access to the mobile device based on the login process:

detect activity by the potential unauthorized user after access to the mobile device has been granted;

determine a security level being violated by the activity, wherein a first security level is associated with a first post-access activity by the potential unauthorized user, wherein a second security level is associated with a second post-access activity by the potential unauthorized user, and wherein the first post-access activity is distinct from the second post-access activity;

select a particular countermeasure of a plurality of countermeasures based on the security level, wherein the plurality of countermeasures comprise a first countermeasure to be performed responsive to the first security level being violated and a second countermeasure to be performed responsive to the second security level being violated, and wherein the first countermeasure and the second countermeasure are distinct, wherein the first countermeasure comprises:

prompting the potential unauthorized user to touch a particular portion of the mobile device, the particular portion of the mobile device comprising a scanner;

scanning a fingerprint of the potential unauthorized user while the unauthorized potential user touches the particular portion of the mobile device; and transmitting identity data based on the fingerprint to a second device;

wherein the second countermeasure comprises:

providing false data in response to commands issued by the potential unauthorized user to engage the potential unauthorized user with the mobile device; and generating information about the potential unauthorized user while the potential unauthorized user is engaged with the mobile device, the information including the fingerprint of the potential unauthorized user, a voice signature of the potential unauthorized user, or both; and perform the particular countermeasure.

17. The apparatus of claim 16, wherein the determination that the particular user is a potential unauthorized user is generated by comparing a behavior threshold to a difference between a plurality of weighted user behavior metrics of the subsequent user behavior and corresponding metrics of the behavior patterns of the user profile.

18. The apparatus of claim 16, wherein the historical data includes physical behavior patterns of the authorized user.

19. A non-transitory computer-readable storage device comprising instructions that, when executed by a processor, cause the processor to perform operations comprising:
generating a user profile for an authorized user of a mobile device based on behavior patterns associated with the authorized user, the behavior patterns determined based on historical data indicating past user behavior of the authorized user, wherein the behavior patterns comprise mobile device usage time patterns of the authorized user;
detecting subsequent user behavior of a particular user attempting to gain access to the mobile device by a login process; and
responsive to determining that the particular user is a potential unauthorized user based on a weighted comparison of the subsequent user behavior during the login process to the behavior patterns of the user profile and responsive to granting access to the mobile device based on the login process:
  detecting activity by the potential unauthorized user after access to the mobile device has been granted;
  determining a security level being violated by the activity, wherein a first security level is associated with a first post-access activity by the potential unauthorized user, wherein a second security level is associated with a second post-access activity by the potential unauthorized user, and wherein the first post-access activity is distinct from the second post-access activity;
  selecting a particular countermeasure of a plurality of countermeasures based on the security level, wherein the plurality of countermeasures comprise a first countermeasure to be performed responsive to the first security level being violated and a second countermeasure to be performed responsive to the second security level being violated, and wherein the first countermeasure and the second countermeasure are distinct, wherein the first countermeasure comprises:
    prompting the potential unauthorized user to touch a particular portion of the mobile device, the particular portion of the mobile device comprising a scanner;
    scanning a fingerprint of the potential unauthorized user while the unauthorized potential user touches the particular portion of the mobile device; and
    transmitting identity data based on the fingerprint to a second device;
  wherein the second countermeasure comprises:
    providing false data in response to commands issued by the potential unauthorized user to engage the potential unauthorized user with the mobile device; and
    generating information about the potential unauthorized user while the potential unauthorized user is engaged with the mobile device, the information including the fingerprint of the potential unauthorized user, a voice signature of the potential unauthorized user, or both; and
  performing the particular countermeasure.

20. The non-transitory computer-readable storage device of claim 19, wherein the historical data includes geographical locations where the authorized user accesses the mobile device.

* * * * *